United States Patent
Bottum, Sr. et al.

(10) Patent No.: US 6,167,945 B1
(45) Date of Patent: Jan. 2, 2001

(54) NON-FREEZING WATERING DISH FOR ANIMALS

(75) Inventors: Edward W. Bottum, Sr.; Edward W. Bottum, Jr., both of Brighton, MI (US)

(73) Assignee: Refrigeration Research, Inc., Brighton, MI (US)

(*) Notice: Under 35 U.S.C. 154(b), the term of this patent shall be extended for 0 days.

(21) Appl. No.: 09/379,474

(22) Filed: Aug. 23, 1999

(51) Int. Cl.[7] .................. A01K 7/00; F28D 15/02
(52) U.S. Cl. ................ 165/45; 165/104.21; 119/73
(58) Field of Search .................. 165/45, 104.21; 119/73

(56) References Cited

U.S. PATENT DOCUMENTS

| | | | | |
|---|---|---|---|---|
| 4,320,720 | * | 3/1982 | Streed | 165/104.21 |
| 4,930,572 | * | 6/1990 | Doshier | 165/45 |
| 4,995,450 | * | 2/1991 | Geppelt et al. | 165/104.21 |
| 5,345,063 | | 9/1994 | Reusche et al. | |
| 5,813,363 | | 9/1998 | Snelling. | |

FOREIGN PATENT DOCUMENTS 57-131989 * 8/1982 (JP) ................. 165/104.21

* cited by examiner

Primary Examiner—Ira S. Lazarus
Assistant Examiner—Sara Clarke
(74) Attorney, Agent, or Firm—MacMillan, Sobanski & Todd, LLC

(57) ABSTRACT

A non-freezing dish includes a sealed tube having a heating end and an opposite condensation end configured to be inserted into the ground with the heated end below grade. A phase change material having a gas phase and a liquid phase is sealed in the tube. Heat is absorbed from the ground into the liquid phase to generate a heated gas phase that rises to the condensation end. A condenser conducts the heat to a removable dish and condenses the gas to a cooled liquid phase that is returned to the heated end.

10 Claims, 2 Drawing Sheets

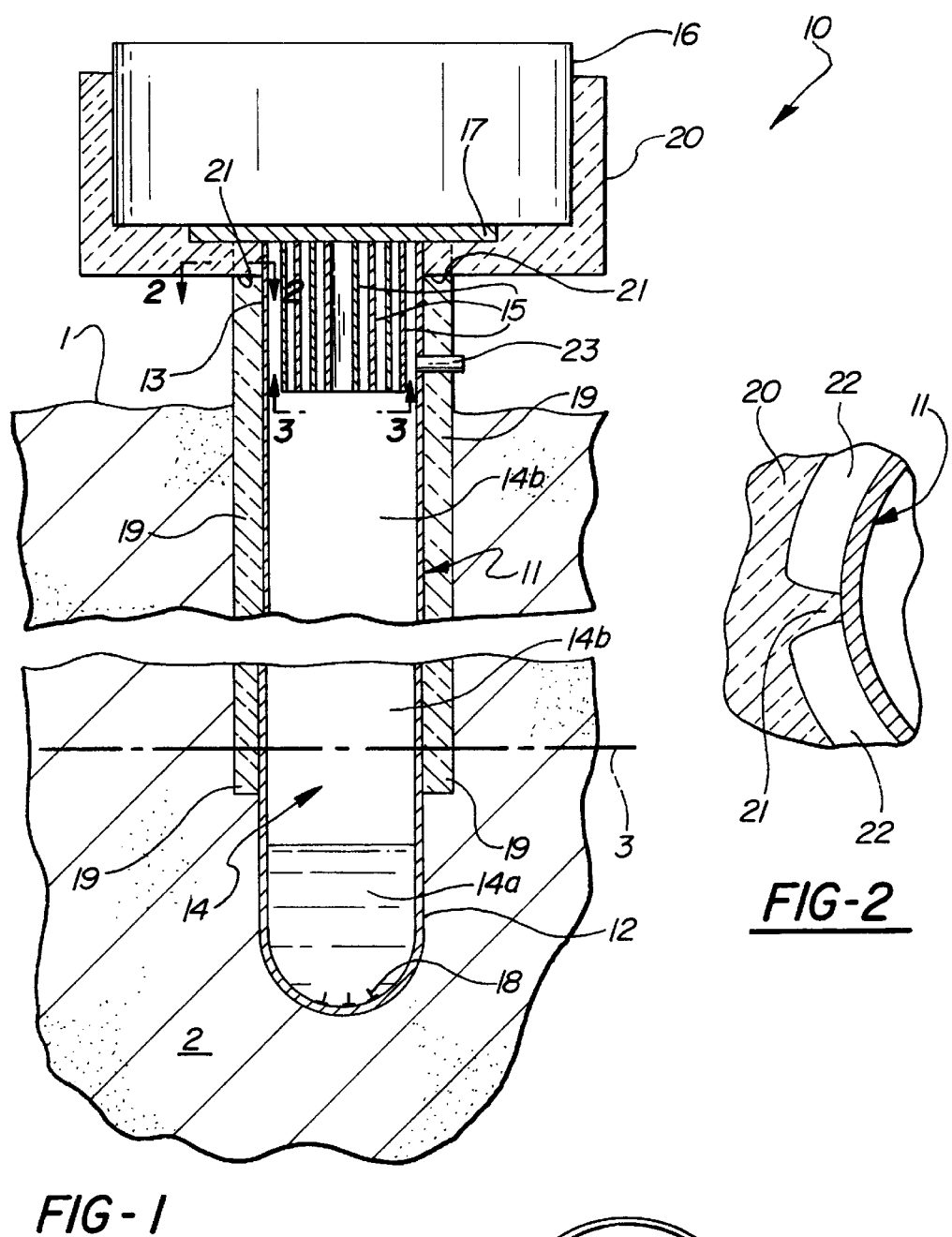
FIG-1
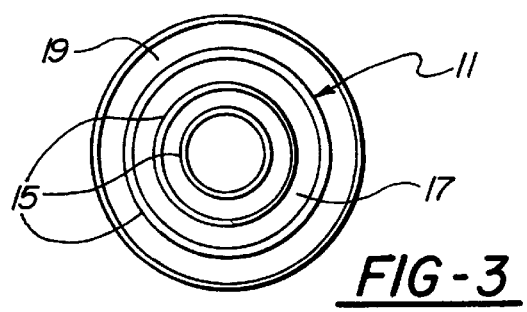
FIG-2
FIG-3

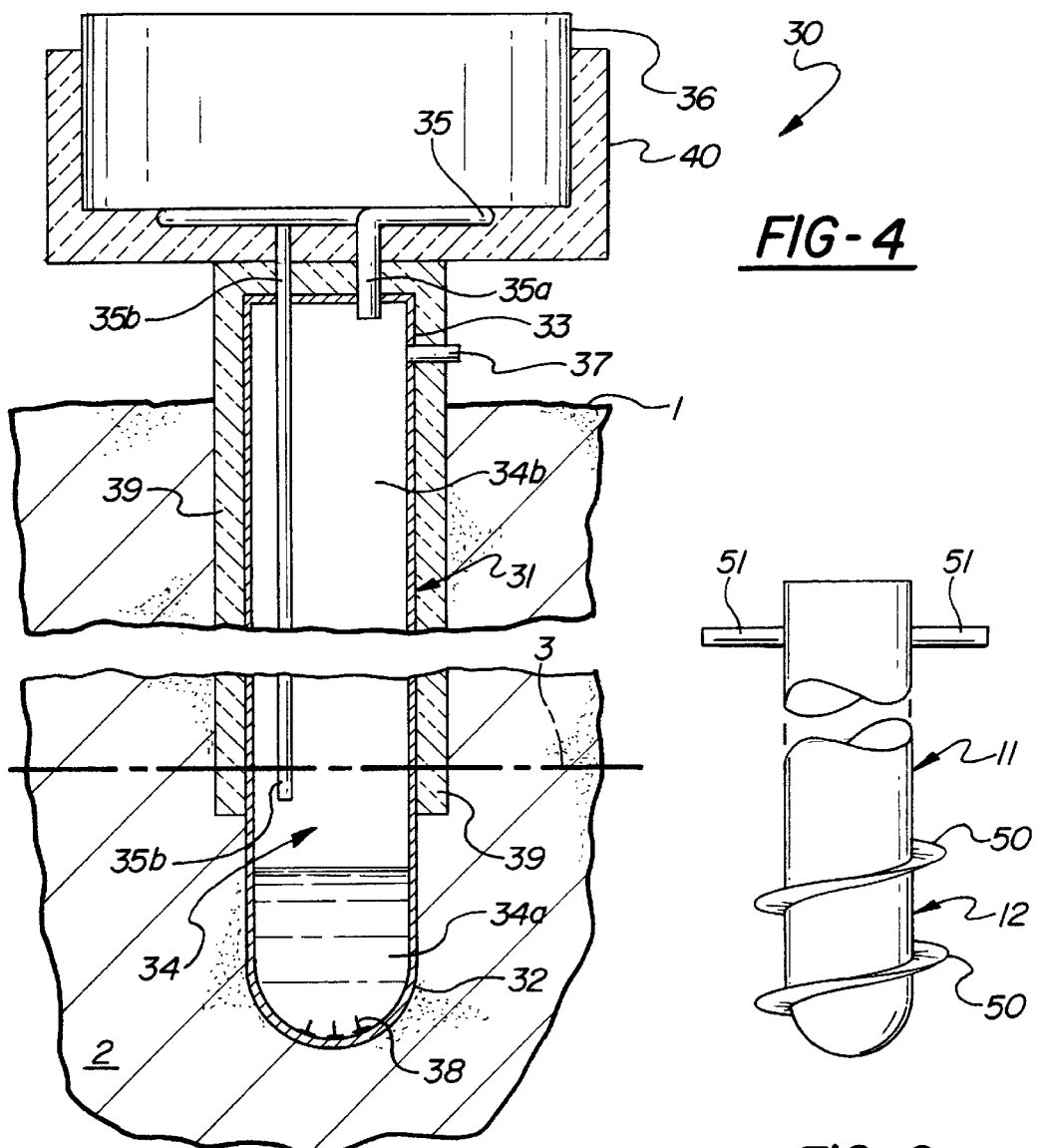
FIG-4
FIG-6
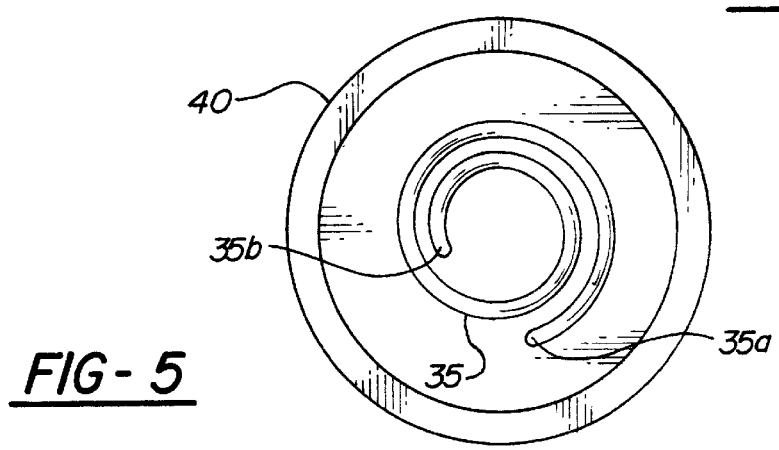
FIG-5

NON-FREEZING WATERING DISH FOR ANIMALS

BACKGROUND OF THE INVENTION

The present invention relates generally to a heated animal or bird watering and/or food dish, and, in particular, to a self-contained dish that is heated without requiring an external power source in order to maintain the contents of the dish at a temperature above freezing.

Livestock, wildlife, and pets that live outdoors need a consistently available source of fresh water and/or food. When ambient temperatures drop below freezing, some means must be provided to keep their water and food sources from freezing.

A number of solutions to the problem of keeping a water source from freezing exist. The simplest, but most impractical, is to provide a running source of water. A common alternative is to use an immersion heater. Immersion heaters are convenient because they are available in a variety of sizes and can be used to heat everything from a large cattle trough holding hundreds of gallons of water to a pet dish holding less than a quart. It is also possible to incorporate a heating element directly into a water dish, such as described in U.S. Pat. No. 5,345,063 to Reusche, et al.

A disadvantage of most heaters is that they require an external source of power, typically electric power. This means that they are an ongoing expense and often require power lines or extension cords to be run long distances. In addition, power failures are more likely to occur during a winter storm, which is exactly when a source of water is most important to livestock, wildlife, and pets.

SUMMARY OF THE INVENTION

The present invention concerns a non-freezing dish apparatus. The dish is heated by geothermal heat, transferred through a tube, by a phase change (gas-liquid) material from below the frost line to a removable or permanent dish above the earth's surface. Such a dish apparatus includes a sealed tube having a heating end and an opposed condensation end. The tube is configured to be inserted into ground soil so that the heated end is below the freezing line. A quantity of phase change material having a gas phase and a liquid phase is sealed in the tube. The gas liquid/phase change material is chosen so that the liquid phase pools in the heating end and vaporizes to the gas phase that rises to the condensation end after having absorbed sufficient ambient heat from the soil. A condensation means, such as a plurality of tubular fins or a coil, is positioned in the condensation end of the tube. Such fins or coil capture heat released as the gas phase is condensed to the liquid phase. A removable dish configured to absorb heat from the fins or coil is positioned at the condensation end of the sealed tube. A plurality of ebulators may be sealed in the tube in the heating end to facilitate boiling of the phase change material.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is a cross-sectional side elevation view of one embodiment of a heated dish apparatus according to the present invention;

FIG. 2 is a fragmentary cross-sectional view of the insulating outer container attachment to the tube taken along the line 2—2 in the FIG. 1;

FIG. 3 is a cross-sectional view of the tube taken along the line 3—3 in the FIG. 1;

FIG. 4 is a cross-sectional side elevation view of another embodiment of a heated dish apparatus according to the present invention;

FIG. 5 is a top plan view of the insulating outer container shown in the FIG. 4 with the dish removed; and FIG. 6 is a fragmentary view of the tube shown in the FIG. 1 with an external thread and handles added.

DESCRIPTION OF THE PREFERRED EMBODIMENTS

The present invention concerns a non-freezing dish for food and/or water that is completely self-contained and requires no supplementary power source. There is shown in the FIG. 1 an embodiment of a non-freezing dish apparatus 10 according to the present invention. This dish apparatus 10 takes advantage of the temperature difference that exists between the surface of the ground and soil below the surface. Because soil is a good insulator, a significant temperature differential develops during the winter between the temperature of the air adjacent to the surface and the soil below the surface. The present invention takes advantage of this differential and draws heat energy from below grade to the surface and uses this heat energy to maintain a bowl of water in the liquid state even during the coldest weather, in order to provide a source of water to livestock, pets, and wildlife such as birds. The dish apparatus 10 also can be used to prevent food from freezing.

The dish apparatus 10 utilizes a sealed tube 11 having a lower heating end 12 and an upper condensation end 13 opposite the heating end. The tube 11 is configured to be inserted into the ground with the heating end 12 extending below a grade 1 into a region of soil 2 that is at least below a freeze line 3 for the area of intended use. If desired, the length of the tube 11 can be selected based on the region of intended use. For example, in the southern parts of the United States, where the temperature rarely dips below freezing, the tube 11 does not need to be as long as it does for use in northern regions where the ground may be frozen solid in a region 8–12" deep for prolonged periods of time. The heating end 12 is shown as being rounded, but could be of any suitable configuration such as pointed.

A predetermined quantity of a phase change material 14 that readily changes between a gas phase and a liquid phase is sealed in the tube 11. The phase change material 14 is chosen so that when the tube 11 is oriented approximately vertically and pushed into the soil, a liquid portion 14a of the phase change material 14 pools in the heating end 12 of the tube with a gas portion 14b above, and the gas pressure in the tube 11 will be the same at the condensation end 13 as at the heating end. The tube 11 is formed of a suitable heat conducting material heat such that energy in the soil region 2 surrounding the heating end 12 will transfer through the wall of the tube 11 and will heat the liquid portion 14a of the material 14. As the temperature of the air surrounding the upper condensation end 13 of the tube 11 drops, the gas portion 14b will lose heat through the wall of the tube causing the gas pressure to drop. The resultant pressure differential will cause the liquid portion 14a to boil and the resulting heated gas phase will rise to the condensation end 13 of the tube.

The condensation end 13, which is cooler than the heating end 12, contains a means for condensing the gas such as a plurality of fins 15. When the rising heated gas contacts the surfaces of the fins 15 it condenses to a cooled liquid phase and gives off heat to the fins. The resulting liquid falls back to the heating end 12 of the tube 11 and the process is repeated. Heat from the condensation is absorbed by the fins 15 and is transferred to a removable dish 16 to heat the contents of the dish. For example, the fins 15 can extend downwardly from a bottom surface of a plate 17 that seals an open top of the tube 11. The dish 16 rests on an upper surface of the plate 17 to receive the heat by conduction. As a result, a liquid for drinking or any food containing moisture placed in the dish 16 will be kept from freezing when the ambient temperature of the surrounding air drops. The fins 15 can be of any suitable configuration such as concentric tubes of different diameters as shown in the FIG. 3.

If desired, a plurality of ebulators 18 may be located in the heating end 12 of the tube 11 to facilitate boiling of the liquid phase change material 14a. The ebulators 18 readily absorb heat from the walls of the tube 11 and can be, for example, conventional carpet tacks. Heat loss through the walls of the tube 11 and through the walls of the dish 16 can be reduced by providing insulation. A sleeve 19 of insulating material can be provided around an upper portion of the tube 11 extending just below the freezing line 3. In the embodiment of FIG. 1, additional insulation is provided around the removable dish 16 by a surrounding cup-shaped insulating container 20. As best shown in the FIG. 2, a pair of opposed tabs 21 extend from a periphery of a central aperture 22 formed in a bottom wall of the container 20. The tabs 21 are attached to the outer surface of the condensation end 13 of the tube 11 that extends through the aperture 22. Thus, the container 20 is spaced from the tube 11 and, consequently, little heat is lost by conduction from the tube to the container. A charging fitting 23 is attached to a side wall of the tube 11 for initially charging the tube with the phase change material 14 and permitting recharging if required.

There is illustrated in FIG. 4 another embodiment of a non-freezing dish apparatus 30 according to the present invention. Like the dish apparatus 10 described above, the dish apparatus 30 uses a sealed tube 31 having a heating end 32 and a condensation end 33 opposite the heating end. The tube 31 is configured to be inserted into the ground and extend below the grade 1 into a region 2 that is at least below the freeze line 3 for the area of intended use. A phase change material 34 that readily changes between a gas phase and a liquid phase is sealed in the tube 31. When a liquid portion 34a boils, the resulting heated gas phase will rise into a gas portion 34b at the condensation end 33 of the tube 31.

A means for condensing such as a condenser coil 35 is positioned above a closed upper end wall of the tube 31. The condenser coil 35 has an inlet end to which an inlet conduit 35a is connected. The inlet conduit 35a extends downwardly through the upper wall of the tube 31 into the upper portion of the condensation end 33 to receive the heated gas phase. The condensation coil 35 can be formed in a spiral shape, as best shown in the FIG. 4, with the inlet conduit 35a at the outer end and an outlet conduit 35b connected to an inner end. The outlet conduit 35b extends downwardly through the upper wall of the tube 11 adjacent the heating end 32. As the heated gas phase passes through the coil 35, it contacts the inner surface of the coil giving off heat and condensing to a cooled liquid phase. The resulting cooled liquid phase flows out of the coil 35 and is delivered to the liquid portion 34a in the heating end 32 of the tube 31 through the outlet conduit 35b.

A removable dish 36 is positioned on top of the coil 35 to absorb the heat and keep the contents warm. A charging fitting 37 is attached to a side wall of the tube 31 for initially charging the tube with the phase change material 34 and permitting recharging if required. If desired, a plurality of ebulators 38 may be positioned in the heating end 32 of the tube 31 to facilitate boiling of the phase change material 34. A sleeve 39 of insulating material can be provided around an upper portion of the tube 31 extending just below the freezing line 3. Additional insulation can be provided around the removable dish 36 by a surrounding cup-shaped insulating container 40. The conduits 35a and 35b extend through apertures formed in the bottom wall of the container 40.

The tube 11 or 31 can be inserted into the ground by forcing it in with downward pressure, where the ground is relatively soft, or by forming a receiving hole much like a typical fence post hole. There is shown in the FIG. 6 an alternate embodiment of the present invention wherein a helical thread 50 is formed on the exterior of the lower end 12 of the tube 11 thereby permitting the tube to be "screwed" into the ground by rotation about its longitudinal axis. As an aid to rotation, opposed handles 51 can be provided on the exterior of the upper end of the tube 11. The threads 50 can be formed of the same material as the tube 11 or a similar suitable material to also provide additional heat exchange area to pick up geothermal heat from the ground.

The present invention is ideal for maintaining water in a liquid state during cold weather for both domestic and wild animals. For example, a number of the described watering devices could be used in a pen to provide water for free range chickens, turkeys, minks, dogs, cats, etc. In addition, the device may be placed close to a bird or squirrel feeder to provide water and draw wild animals closer to a dwelling where they can be more easily observed. Accordingly, the present invention may be sized to better fit its intended application.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A non-freezing dish apparatus comprising:

a sealed tube having a heating end and an opposed condensation end, said heating end being adapted to be inserted into the ground and being formed of a heat conducting material;

a phase change material having a gas phase portion and a liquid phase portion sealed in said tube, said liquid phase portion being pooled in said heating end for absorbing heat from the ground;

a means for condensing positioned adjacent said condensation end of said tube, said means for condensing causing condensation of and heat exchange from said gas phase portion in contact therewith;

a dish in heat exchange contact with said means for condensing whereby when said heating end is inserted into the ground, a drop in temperature of air surrounding said condensation end and absorption of heat from the ground by said liquid phase portion generates a heated gas phase, said heated gas phase rising to said condensation end of said tube and condensing to a cooled liquid phase that returns to said heating end thereby heating said dish; and said means for condensing including one of a plurality of generally concentric tubular fins extending downwardly from said condensation end of said tube, said dish being in heat exchange contact with an exterior surface of said condensation end of said tube, and a coil positioned outside said condensation end of said tube, said dish being in heat exchange contact with said coil.

2. The non-freezing dish apparatus according to claim 1 wherein said tube has a predetermined length between said ends sufficient whereby when said tube is inserted into the ground, said heating end is below a freeze line and said condensation end is above grade.

3. The non-freezing dish apparatus according to claim 1 wherein said coil is hollow and including an inlet conduit connected to one end of said coil and extending into said condensation end of said tube for receiving said heated gas phase and an outlet conduit connected to another end of said coil and extending through said condensation end of said tube adjacent to said heating end of said tube for delivering said cooled liquid phase to said liquid phase portion.

4. The non-freezing dish apparatus according to claim 1 including a plurality of ebulators positioned in said heating end of said tube.

5. The non-freezing dish apparatus according to claim 1 including an insulating sleeve surrounding a portion of said tube adjacent said condensation end.

6. The non-freezing dish apparatus according to claim 1 including a helical thread on an exterior surface of said heating end of said tube.

7. The non-freezing dish apparatus according to claim 6 wherein said helical thread is formed of a heat conducting material.

8. The non-freezing dish apparatus according to claim 6 including at least one handle attached to an exterior surface of said tube for rotating said tube about a longitudinal axis thereof.

9. A non-freezing dish apparatus comprising:

a sealed tube having a heating end and an opposed condensation end, said heating end being adapted to be inserted into the ground and being formed of a heat conducting material;

a phase change material having a gas phase portion and a liquid phase portion sealed in said tube, said liquid phase portion being pooled in said heating end for absorbing heat from the ground;

a means for condensing positioned adjacent said condensation end of said tube, said means for condensing causing condensation of and heat exchange from said gas phase portion in contact therewith;

a dish in heat exchange contact with said means for condensing whereby when said heating end is inserted into the ground, a drop in temperature of air surrounding said condensation end and absorption of heat from the ground by said liquid phase portion generates a heated gas phase, said heated gas phase rising to said condensation end of said tube and condensing to a cooled liquid phase that returns to said heating end thereby heating said dish; and an insulating container for receiving said dish, said insulating container having an aperture formed therein for receiving said condensation end of said tube and including at least one tab extending from a periphery of said aperture and being attached to said tube to space said container from said tube.

10. A non-freezing dish apparatus comprising:

a sealed tube having a heating end and an opposed condensation end, said heating end being adapted to be inserted into the ground and being formed of a heat conducting material;

a phase change material having a gas phase portion and a liquid phase portion sealed in said tube, said liquid phase portion being pooled in said heating end for absorbing heat from the ground;

a means for condensing positioned adjacent said condensation end of said tube, said means for condensing causing condensation of and heat exchange from said gas phase portion in contact therewith; and a dish in heat exchange contact with said means for condensing, said dish being removable from said means for condensing, whereby when said heating end is inserted into the ground, a drop in temperature of air surrounding said condensation end and absorption of heat from the ground by said liquid phase portion generates a heated gas phase, said heated gas phase rising to said condensation end of said tube and condensing to a cooled liquid phase that returns to said heating end thereby heating said dish.

* * * * *